US012744433B2

(12) United States Patent
Kastner et al.

(10) Patent No.: US 12,744,433 B2
(45) Date of Patent: Sep. 22, 2026

(54) AIR COOLING APPARATUS FOR ELECTRIC MACHINE

(71) Applicant: ANDRITZ HYDRO GmbH, Vienna (AT)

(72) Inventors: Gebhard Kastner, Leoben (AT); Daniel Langmayr, Kumberg (AT); Enes Blazevic, Prebensdorf (AT)

(73) Assignee: ANDRITZ HYDRO GmbH, Vienna (AT)

( * ) Notice: Subject to any disclaimer, the term of this patent is extended or adjusted under 35 U.S.C. 154(b) by 231 days.

(21) Appl. No.: 18/276,377

(22) PCT Filed: Feb. 8, 2022

(86) PCT No.: PCT/AT2022/060038

§ 371 (c)(1),
(2) Date: Aug. 8, 2023

(87) PCT Pub. No.: WO2022/226555

PCT Pub. Date: Nov. 3, 2022

(65) Prior Publication Data

US 2024/0113598 A1 Apr. 4, 2024

(30) Foreign Application Priority Data

Apr. 27, 2021 (AT) .............................. A 50314/2021

(51) Int. Cl.
*H02K 9/22* (2006.01)
*H02K 9/04* (2006.01)

(52) U.S. Cl.
CPC ............... *H02K 9/227* (2021.01); *H02K 9/04* (2013.01); *H02K 2209/00* (2013.01)

(58) Field of Classification Search
CPC ............ H02K 9/227; H02K 9/08; H02K 9/04; H02K 9/10; H02K 9/14; H02K 9/18
See application file for complete search history.

(56) References Cited

U.S. PATENT DOCUMENTS 4,908,541 A * 3/1990 Kawazoe ............. H02K 15/066 310/63
2004/0007878 A1 1/2004 Nelson et al.
(Continued)

FOREIGN PATENT DOCUMENTS

DE 30 07 917 9/1981
DE 10 2013 200 105 4/2014
(Continued)

OTHER PUBLICATIONS

EP1653592A2 translation (Year: 2006).*
(Continued)

*Primary Examiner* — Oluseye Iwarere
*Assistant Examiner* — Nicholas Lee Setzer
(74) *Attorney, Agent, or Firm* — GREENBLUM & BERNSTEIN, P.L.C.

(57) ABSTRACT

Electrical machine, e.g., a generator, having a stator comprising a winding overhang, a rotor arranged rotatable in the stator, and a heat exchanger fluidically connected to the winding overhang via a coolant shaft, which is arranged radially outside the winding overhang, runs at least partially approximately along a circumferential direction, and is delimited in a radial direction by an outer surface, so that the winding overhang can be cooled by a continuous flow of a fluid over the heat exchanger and the winding overhang. To obtain uniform cooling of the winding overhang, multiple guiding elements are arranged in a distributed manner along a circumferential direction in the coolant shaft to redirect a flow of a fluid oriented in a circumferential direction in the coolant shaft at least partially into a radial flow towards the winding overhang and to distribute the flow to multiple regions of the winding overhang.

18 Claims, 3 Drawing Sheets

(56) References Cited

U.S. PATENT DOCUMENTS

| | | | | |
|---|---|---|---|---|
| 2006/0043801 | A1 * | 3/2006 | Adra | H02K 3/24 310/54 |
| 2016/0276904 | A1 * | 9/2016 | Matsumoto | H02K 3/24 |
| 2017/0141652 | A1 * | 5/2017 | Ikonen | H02K 5/18 |
| 2017/0149307 | A1 * | 5/2017 | Ichinoe | H02K 3/24 |
| 2018/0183301 | A1 * | 6/2018 | Lange | H02K 9/227 |
| 2018/0309348 | A1 | 10/2018 | Noishikawa et al. | |
| 2019/0214870 | A1 * | 7/2019 | Neumayer | H02K 7/1823 |
| 2020/0313499 | A1 * | 10/2020 | Spierling | H02K 9/12 |
| 2024/0113598 | A1 * | 4/2024 | Kastner | H02K 9/227 |

FOREIGN PATENT DOCUMENTS

| | | | |
|---|---|---|---|
| DE | 10 2018 129 897 | 5/2020 | |
| DE | 10 2019 117 832 | 1/2021 | |
| EP | 1 653 592 | 5/2006 | |
| EP | 1653592 A2 * | 5/2006 | H02K 5/203 |
| EP | 3 716 448 | 9/2020 | |
| JP | 2010-154585 | 7/2010 | |
| JP | 2012-029398 | 2/2012 | |
| JP | 2012-244659 | 12/2012 | |
| JP | 2014-87248 | 5/2014 | |

OTHER PUBLICATIONS

Int'l Search Report (Form PCT/ISA/210) conducted in Int'l Appln. No. PCT/AT2022/060038 (Apr. 29, 2022).

Int'l Written Opinion (Form PCT/ISA/237) conducted in Int'l Appln. No. PCT/AT2022/060038 (Apr. 29, 2022).

Int'l Prelim. Exam. Report (Form PCT/IPEA/408) conducted in Int'l Appln. No. PCT/AT2022/060038 (Apr. 29, 2022).

Austria Search Report/Office Action conducted in counterpart Austria Appln. No. 3 A50314/2021 (Oct. 29, 2021).

Australia Search Report/Office Action conducted in counterpart Australia Appln. No. 2022264861 (May 30, 2024).

Chile Search Report/Office Action conducted in counterpart Chile Appln. No. 202302988 (Aug. 20, 2024).

Korea Office Action conducted in counterpart Korea Appln. No. 10-2023-7026935 (Sep. 17, 2025).

Japan Office Action conducted in counterpart Japan Appln. No. 2023-547086 (Jan. 13, 2026).

* cited by examiner

AIR COOLING APPARATUS FOR ELECTRIC MACHINE

The invention relates to an electrical machine, in particular a generator, having a stator comprising a winding overhang, a rotor arranged rotatably about a rotor axis in the stator, and a heat exchanger, wherein the heat exchanger is fluidicaily connected to the winding overhang via a coolant shaft, which is arranged radially outside the winding overhang, runs at least partially approximately along a circumferential direction, and is delimited in a radial direction by an outer surface, so that the winding overhang can be cooled by means of a continuous flow of a fluid over the heat exchanger and the winding overhang.

Electrical machines of the type named at the outset are well known from the prior art. A temperature of the winding overhang continues to pose a difficulty in constructing a machine of this type. The winding overhang thus typically heats up heavily during operation due to losses occurring in this region, which is why machines of this type are often designed as externally ventilated machines, wherein one or more fans are arranged in a flow path of a cooling fluid, which flow path leads from the heat exchanger to the winding overhang and, via a different return flow path, for example through a laminated stator core, back to the heat exchanger, so that a circulating flow can achieved in the machine, wherein the cooling fluid, typically air, absorbs heat at the winding overhang and releases it at the heat exchanger.

In machines of this type, the heat exchanger is, as a rule, arranged in an upper, lower, or lateral region of the stator, as a rule outside the rotation axis, so that individual winding overhang regions along a flow path of the cooling fluid are spaced farther apart from the heat exchanger and the fan(s) than others, whereby a uniform cooling of the winding overhang over an entire circumference is difficult and hot spots often arise which can in particular cause damage to an insulation.

This is addressed by the invention. The object of the invention is to specify a machine of the type named at the outset in which a particularly uniform cooling of the winding overhang is enabled.

According to the invention, this object is attained by an electrical machine of the type named at the outset in which multiple guiding elements arranged in a distributed manner along a circumferential direction are provided in the coolant shaft in order to redirect a flow of a fluid oriented in a circumferential direction in the coolant shaft at least partially into a radial flow towards the winding overhang and to distribute the flow to multiple regions of the winding overhang.

In the course of the invention, it was found that, with correspondingly arranged guiding elements which redirect a flow initially oriented in a circumferential direction in the coolant shaft at least partially into a radial flow towards the winding overhang in each case, a uniform distribution of air to individual regions of the winding overhang is enabled, even though a supply to the coolant shaft, as a rule, occurs asymmetrically and from only one side, especially since the heat exchanger, normally embodied as an air-to-water heat exchanger, is typically arranged below a laminated stator core. It is thus achieved that a cooling fluid also reaches a side of the winding overhang facing away from an inflow side, from which the cooling fluid enters the coolant shaft, and that said side is also cooled, in particular in order to avoid a formation of hot spots in this region.

In machines of this type, the rotor axis is typically roughly horizontally oriented, or the machine is embodied as a horizontal machine, although the rotor axis can, of course, also be arranged at an angle to a horizontal line, in particular vertically.

A return flow path via which the cooling fluid can flow back to the heat exchanger after the absorption of heat in the winding overhang can, for example, run through the stator, in particular through the laminated stator core.

The cooling fluid thus normally forms a flow that continuously circulates in the machine between the winding overhang and heat exchanger, in order to transport heat losses of the winding overhang region, and possibly of a laminated core region, from the winding overhang to the heat exchanger, and out of the machine via the heat exchanger, by means of the cooling fluid.

It is preferably provided that the guiding elements are roughly radially oriented. By orienting the guiding elements, which are preferably embodied to be plate-shaped, along the radial direction, a particularly good redirection of a tangential inflow into the coolant shaft to a radial flow in the direction of the winding overhang can be achieved.

Here, the terms radial direction and circumferential direction are to be understood in the sense of a cylindrical coordinate system of the rotor of the machine, with the circumferential direction corresponding to a possible rotation direction of the rotor about the rotor axis.

A portion of a flow that is redirected into a radial flow towards the winding overhang by a guiding element thus has a greater velocity vector with a greater velocity component towards the rotor axis after the redirection than before the redirection. In the sense of the cylindrical coordinate system, this portion of the flow, or a corresponding flow volume, thus has a greater velocity component in a negative radial direction and a smaller velocity component magnitude in a circumferential direction, or against the circumferential direction, after the redirection than before the redirection.

It is preferably provided that the outer surface is at least partially embodied roughly as a surface of revolution with the rotor axis, in particular as an outer cylinder surface or outer cone surface. As a result, a roughly radial inflow into the coolant shaft can, in a particularly efficient manner, be redirected, typically by a fan arranged on a side of the winding overhang that can also be referred to as the inflow side, into a flow that partially runs in a circumferential direction, with which flow a side of the winding overhang opposite from the inflow side is also reached, in order to also cool said portion of the winding overhang.

Thus, a flow of the cooling fluid is redirected into a flow that runs roughly tangentially or along a circumferential direction via the outer surface of the coolant shaft, which outer surface is rotationally symmetrical to the rotor axis, whereupon said flow running in a circumferential direction can be redirected into a radial flow in individual regions of the winding overhang by means of the guiding elements, in order to cool the winding overhang in a most uniform possible manner. In this context, it is particularly beneficial if, in a region of the winding overhang located opposite from the inflow side, the individual guiding elements respectively redirect into a radial direction an approximately equal part of the flow running in a circumferential direction, so that the individual guiding elements in said region redirect approximately equal portions of the flow oriented in a circumferential direction or respectively shave off approximately equal portions towards the inside from a flow oriented in a circumferential direction.

It is preferably provided that the guiding elements are arranged with an approximately equal spacing from the rotor axis. The guiding elements can, for example, be embodied as guide plates which are arranged in the air shaft that can be part of a housing of the generator. However, the guiding elements can also be elements connected to the winding overhang which are suitable for at least partially redirecting a flow into a radial flow towards the winding overhang, in particular connection towers.

It has proven effective that 10 to 100, in particular 30 to 60, guiding elements are arranged in a distributed manner over a circumference. As a result, a particularly uniform distribution of the fluid flow, which typically circulates in the machine between the heat exchanger(s) and the winding overhang(s), to individual portions of the winding overhangs) can be achieved.

As a rule, the machine comprises two winding overhangs that are each cooled using a cooling fluid. It is preferably provided that the cooling fluid is moved into an interior of the stator through an air gap after passing through the winding overhang, after which it is moved radially outwardly through ventilation slots in the laminated stator core and, in the process, absorbs heat from the laminated stator core, whereupon the cooling fluid is moved back to the heat exchanger and to the fan, which can comprise one or more fan devices, in particular one or more axial fans or radial fans. The cooling fluid thus normally circulates along a circumferential flow path from the heat exchanger via the fan to the winding overhang, to the stator, and back to the heat exchanger again.

It is particularly preferable if it is provided that each cooling fluid that circulates in the machine is moved across one of the winding overhangs, in order to cool said winding overhangs particularly well. A machine of this type is also referred to as a serially ventilated machine.

It is typically provided that the guiding elements are arranged with a spacing from the outer surface. A flow fluid is thus transported through a clear flow cross section between the outer surface and the guiding elements to regions of the winding overhang that are even farther away from an inflow side along a flow path, while a portion of the flow is simultaneously redirected in a radial direction towards the winding overhang region via the individual guiding elements. Thus, a uniform ventilation of individual portions of the winding overhang with a simultaneously simple constructive design is enabled, especially since a volume flow flowing radially outside the guiding elements is virtually uninfluenced by the guiding elements, and the effect of the guiding elements can therefore be precisely limited. A defined portion of the volume flow moved along a circumferential direction in the coolant shaft can thus be shaved off and redirected radially inwardly in a targeted manner using the guiding elements.

It is beneficial if the guiding elements have different, in particular continuously decreasing, spacings from the outer surface, wherein the guiding elements have a smaller spacing from the outer surface at an increasing distance from the heat exchanger in a direction of flow. A clear flow cross section between the outer surface and the guiding elements arranged in the coolant shaft thus decreases at an increasing distance from the heat exchanger in a direction of flow, namely preferably by an approximately equal magnitude from one guiding element to the next guiding element, for example by 1 mm to 20 mm in a radial direction from one guiding element to the next guiding element along the direction of flaw in the coolant shall Constructively, this can be achieved, for example, by guiding elements which extend farther in a radial direction at an increasing distance from the heat exchanger in the direction of flow, which guiding elements can be embodied, for example, with a cross section that is roughly constant in an axial direction.

Preferably, the guiding elements extend in an axial direction roughly over a length that corresponds to a length of the winding overhang and/or to an axial length of the coolant shaft.

For example, the guiding elements can be embodied to be plate-shaped, in particular roughly cube-shaped, and narrow sides can extend roughly along the radial direction and parallel to the rotor axis, so that a surface of the guiding elements that has a largest surface area is oriented roughly perpendicularly to the circumferential direction in order to produce a particularly effective redirection of flow.

Using guiding elements embodied to have a different length in a radial direction, a particularly uniform cooling of the winding overhang over a circumference of the same is achieved in a constructively simple manner, especially since an approximately equal volume flow is shaved off, or is redirected radially inwardly towards the winding overhang, at each guiding element. In particular, it is thereby prevented that a downstream guiding element arranged after an upstream guiding element produces no, or only an insufficient, redirection of a volume flow in a radial direction due to a shadowing effect by the upstream guiding element.

It is particularly preferred if it is provided that a clear flow cross section between the outer surface and a guiding element continuously decreases, at least in some regions, from one guiding element to the next guiding element at an increasing distance from the heat exchanger in the direction of flow. If, in a section perpendicular to the rotor axis, the coolant shaft is, at least in some regions, embodied to be roughly annular, that is, with an essentially constant spacing of the outer surface from the rotor axis, which can be preferred, a correspondingly increasingly smaller spacing between the outer surface and the guiding elements along the direction of flow can be achieved by guiding elements that have a greater extension in a radial direction at an increasing distance from the heat exchanger in the direction of flow, so that with an approximately equal spacing from the rotor axis, said guiding elements protrude farther radially outwardly into the coolant shaft at an increasing distance from the heat exchanger in the direction of flow. Thus, at an increasing distance from the heat exchanger, guiding elements preferably extend farther radially outwardly, or into the coolant shaft, so that a clear flow cross section along the direction of flow becomes smaller.

Alternatively or additionally to guiding elements having a different length, a clear flow cross section that decreases at a distance from the heat exchanger in the direction of flow can, of course, also be achieved by a cross section of the coolant shaft that decreases along the direction of flow, in particular with a coolant shaft embodied, at least in some regions, to be roughly helical.

Using a size of the clear cross section, or the spacing between the guiding elements and the outer surface, it is thus easily possible to achieve a division of the incoming flow, essentially oriented in a circumferential direction, into a first portion and a second portion, wherein the first portion is redirected inwardly in a radial direction, in order to cool a winding overhang region assigned to the respective guiding element, and wherein the second portion of the flow is oriented in a circumferential direction, in order to cool winding overhang regions located downstream in the direction of flow.

It shall be understood that, for a specific constructive embodiment of the coolant shaft and of the guiding elements, numerical methods of calculation can also be used for flow simulation.

The guiding elements can, in principle, be embodied in any desired manner. To achieve a constructively simple and simultaneously mechanically stable design, it has proven effective if the guiding elements are embodied to be plate-shaped. The guiding elements can formed by elements connected in a fixed manner to the coolant shaft and/or in a fixed manner to the winding overhang, in particular by modified connection towers that are connected to the winding overhang, or by guide plates that are arranged in the coolant shaft, for example are welded or screwed together with a portion of the housing that forms the coolant shaft.

It can also be provided that the guiding elements can be releasably attached and fixed in place in different positions in the coolant shaft, in particular can be rotated or pivoted, in order to be able to easily perform a fine adjustment on site.

It has been shown that a particularly uniform and effective cooling of the winding overhang can be achieved if at least some guiding elements comprise a rounded edge, preferably on a discharge side, at an end that delimits a clear flow cross section between the outer surface and the guiding elements. In this manner, turbulences on the discharge side, which would negatively influence a redirection, are reduced or avoided. For example, the guiding elements can be embodied as plates and, at the radial outer edge of the discharge side, that is, a side located downstream, can comprise a rounding with a radius of 0.5 mm to 10 mm.

Particularly on a connection side of the generator, it can be provided that the guiding elements are formed by elements connected in a fixed manner to the winding overhang, in particular connection towers. In the connection towers, which are composed of insulating material, an electrical connection is produced between individual electrical conductors of the stator in the winding overhang, in particular on a side of the generator that is referred to as the connection side, so that said connection towers are positioned at regular intervals over a circumference of the winding overhang and are therefore suitable at the same time for use as guiding elements.

For this purpose, the connection towers can comprise plate-shaped elements oriented roughly in a radial direction, or can be formed by correspondingly oriented elements that thus extend into the coolant shaft.

The machine according to the invention can, in principle, also be embodied without external ventilation in that a flow is produced solely by a rotation of the rotor. However, it is preferably provided that a fan, in particular an axial fan or a radial fan, is provided, with which a flow of a fluid, in particular of air, can be produced in the machine from the heat exchanger through the coolant shaft to the winding overhang and back to the heat exchanger. The fan can be embodied, for example, to achieve a volume flow rate of 6 $m^3$ per second at a pressure difference of 2000 Pa and an air density of 1.2 $kg/m^3$, although a specific embodiment depends, of course, on a constructive design of the machine.

Normally, in the case of a rotating electrical machine that can be embodied as a motor or generator, for example, two winding overhangs are provided on the stator, wherein in principle, separate fans or other devices for increasing a pressure, and possibly also separate heat exchangers, can, of course, also be provided for each winding overhang. It is preferably provided, however, that the stator comprises two winding overhangs and each winding overhang is connected to the fan and the heat exchanger via a separate flow path. As a result, a simple design and a redundancy can easily be achieved, especially since the fan and the heat exchanger can, for example, comprise two or three separate fans and heat exchangers, respectively, wherein a sufficient cooling can be ensured even in the event of a failure of a fan or heat exchanger.

In order to achieve a particularly uniform division of a flow volume into individual regions of the winding overhang, it is preferably envisaged that separate flow paths are provided for an upper region of the winding overhang and a lower region of the winding overhang. Typically, the upper region of the winding overhang is at a greater distance from the heat exchanger, or a flow path from the heat exchanger to the upper region of the winding overhang is longer than a flow path from the heat exchanger to the lower region of the winding overhang, so that a uniform distribution can be achieved via correspondingly separated flow paths, for example in that a cross section of the flow path that connects the heat exchanger to the lower region of the winding overhang is smaller, and a corresponding pressure loss therefore greater, than a cross section of the flow path that connects the heat exchanger to the upper region of the winding overhang. A separation of a volume flow by a fan Which can comprise one or more fan devices such as axial fans can, for example, occur by means of a separating element in a region located downstream from the fan.

In addition, a division into a left-hand and right-hand partial volume flow can, for example, also still be expedient, in particular for an upper region of the winding overhang, or for a region of the winding overhang farther away from the inflow side.

Furthermore, a division of the volume flow preferably takes place into separate portions for the individual winding overhangs, that is, into one portion for a winding overhang on the connection side of the machine and one portion for a winding overhang on a non-connection side of the machine, so that the volume flow of a cooling fluid moved by the fan or in the machine is typically divided into four partial volume flows with which the two winding overhangs are each separately ventilated at the top and bottom, wherein the four partial volume flows can then be moved back to the heat exchanger and the fan through an air gap via ventilation slots in the stator. Particularly if there is also a division into partial volume flows for a left-band region of the winding overhang and a right-hand region of the winding overhang, a division into more than four partial volume flows can, of course, also be expedient, for example into six or eight partial volume flows.

Additional features, advantages, and effects of the invention follow from the exemplary embodiment illustrated below. In the drawings which are thereby referenced:

Figure 1:
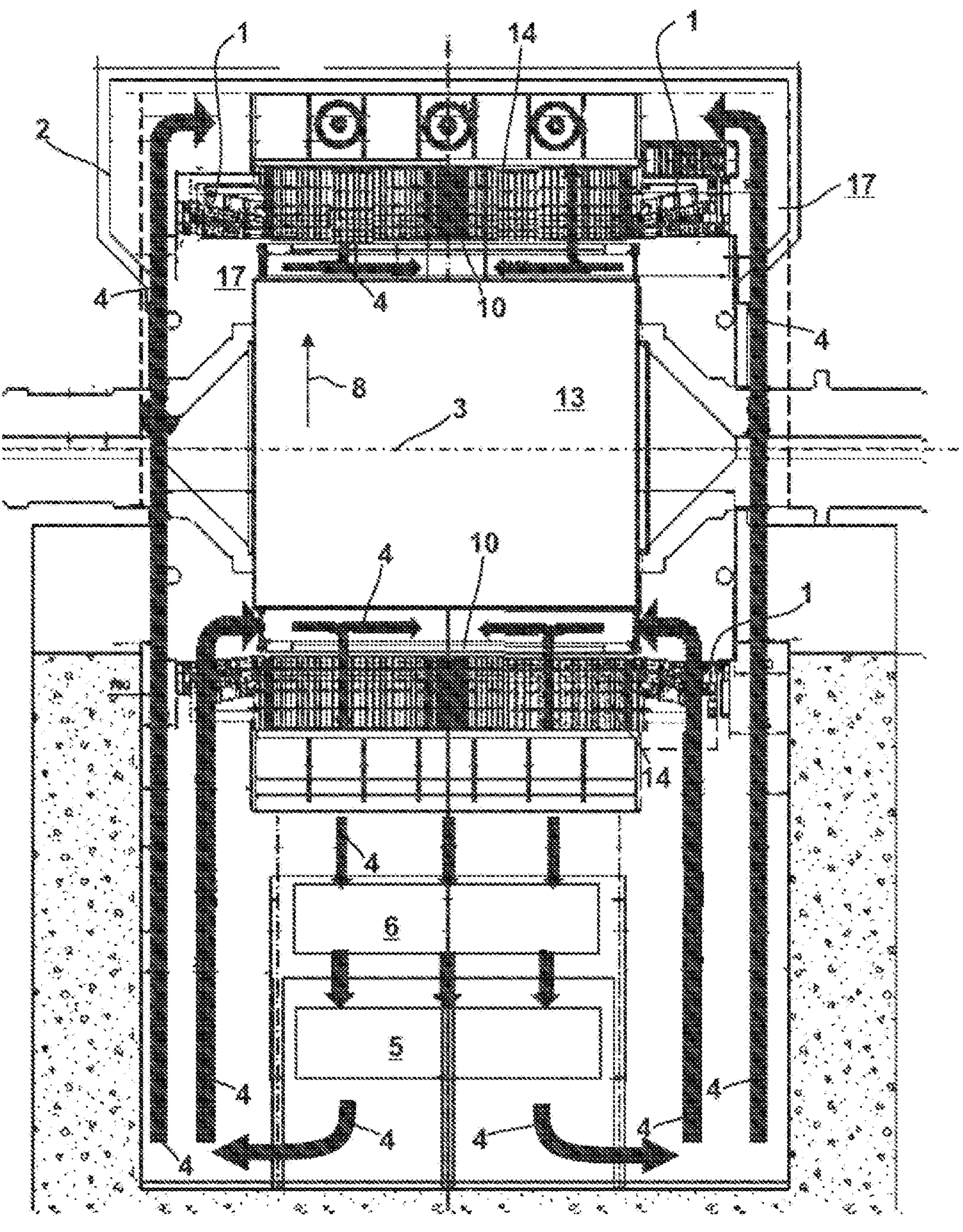
FIG. 1 shows a machine according to the invention in a sectional illustration.

FIG. 1 shows an electrical machine according to the invention in a sectional illustration. As can be seen, the rotating electrical machine embodied as a motor generator is embodied in this case as a horizontal machine, which can be used in a hydroelectric power plant for example, and thus comprises a horizontal rotor axis 3. A machine according to the invention can, however, also be embodied as a vertical machine. The machine illustrated is embodied as an externally ventilated machine, wherein a fan 5 is arranged below a stator. Using the fan 5, a continuous fluid flow in the machine can be obtained, by which air or a different cooling fluid is transported, being divided into multiple partial volume flows, along the four schematically illustrated flow paths 4 from the fan 5 through air shafts to winding overhangs of the stator, where it is separately transported to upper and lower regions of the winding overhangs, at which heat is released by the winding overhang 1 to the cooling fluid.

Via an air gap 10 between the rotor 13 and stator, the cooling fluid subsequently reaches ventilation slots arranged in the stator, via which ventilation slots the cooling fluid flows radially outwardly through a laminated stator core 14 and thereby absorbs heat from the stator, whereupon the cooling fluid flows back to the fan 5 via the heat exchanger 6, embodied as an air-to-water heat exchanger 6 in this case, at which the cooling fluid emits heat. A return flow path of all four partial volume flows thus leads in this case through the air gap 10 and the laminated stator core 14.

As can be seen in FIG. 1, the entire machine is externally ventilated in this case by a fan 5 arranged below the stator, wherein the fan 5 can, of course, also be formed by multiple fan devices, for example by eight axial or radial fans.

As illustrated, an entire amount of air on which the fan 5 acts is preferably guided over the winding overhangs, so that a serial cooling is achieved, whereby a serially cooled horizontal machine is obtained.

In a fan outlet region, the volume flow for a winding overhang 1 on a connection side of the machine as well as a volume flow for a winding overhang 1 on a non-connection side of the machine are each divided into two parallel branches, wherein one branch supplies an upper region of the winding overhangs with cooling fluid and one branch supplies a lower region of the winding overhangs. This is expedient in this case, especially because an inflow side, from which the cooling fluid is transported to the winding overhang 1, is arranged here below the stator, so that flow paths 4 to the lower region of the winding overhang 1 are correspondingly shorter than flow paths 4 of the cooling fluid to the upper region of the winding overhang 1. By choosing appropriate cross sections of the flow paths 4 to the upper region and to the lower region, a very uniform flow into, and therefore cooling of, these regions, which are spaced apart from the fan 5 by different distances, can thus still be ensured. It shall be understood that, especially if the fan 5 were not positioned below, but rather at the side of the stator, a division into a left-hand region and a right-hand region of the winding overhang 1 could also be beneficial.

Furthermore, a division takes place to the two winding overhangs of the stator, that is, to a winding overhang 1 on a connection side of the stator and a winding overhang 1 on a non-connection side of the stator. The volume flow of the cooling fluid circulating in the machine is thus divided into four partial volume flows, as can be seen in FIG. 1 on the basis of the separate flow paths 4 to the winding overhangs.

Figure 2:
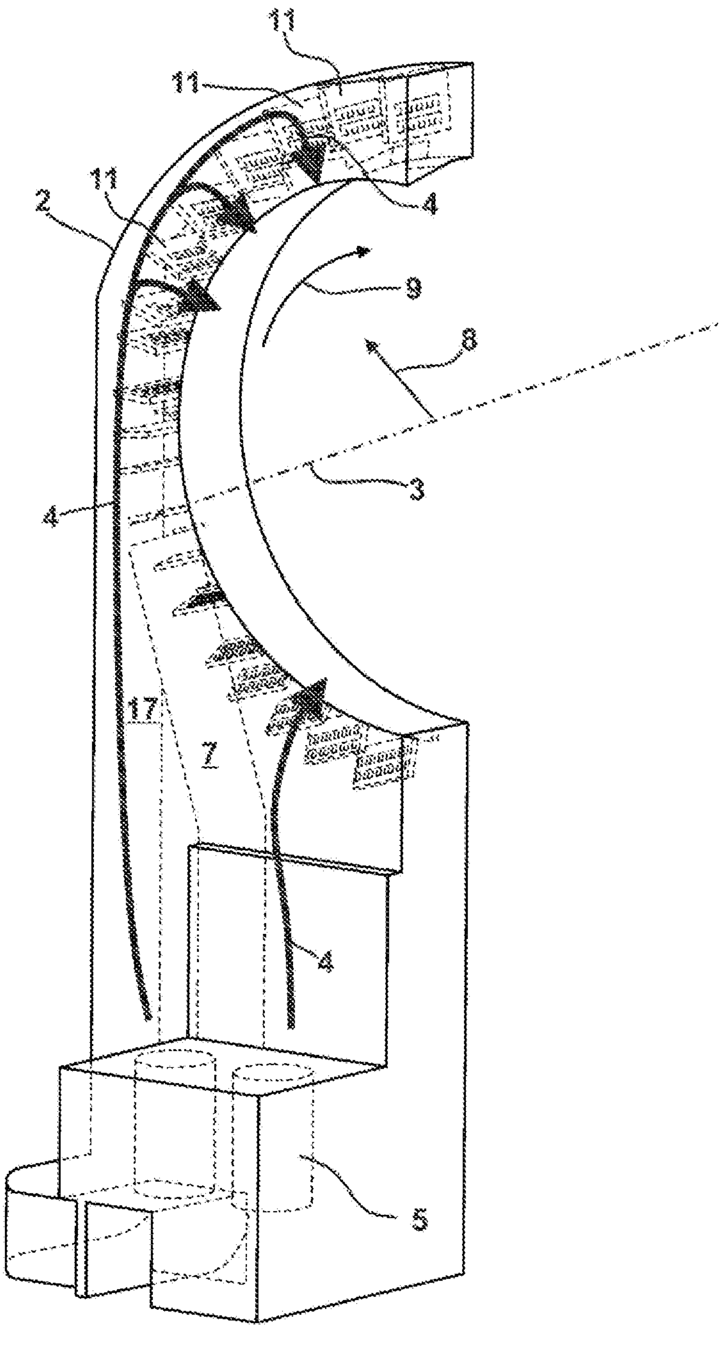
FIG. 2 shows a detail of a mac line according to the invention.

FIG. 2 shows a portion of the connection side of the machine illustrated in FIG. 1. As can be seen, a portion of a housing 2 of the machine comprises a coolant shaft 17 through Which the cooling fluid is guided to the winding overhang by the fan 5, which is schematically illustrated in a lower region.

Additionally, in relation to the upper region of the winding overhang 1, a division of the volume flow takes place into a partial volume flow for a right-hand region of the winding overhang 1 and a partial volume flow for a left-hand region of the winding overhang 1. FIG. 2 shows a ventilation of one of these two portions, for example the left-hand portion. The machine region of the second portion is accordingly constructed symmetrically on a vertical center plane to the portion illustrated in FIG. 2, so that a flow in the upper region of the winding overhang 1 in said portion runs in an opposing manner to the illustrated portion.

The illustrated portion of the housing 2 comprises an approximately rotationally symmetrical inner region in which the winding overhang 1, which is not illustrated, is arranged. Because the fan 5 is, as can be seen, positioned below the winding overhang 1, a flow path 4 from the fan 5 to an upper region of the winding overhang 1 is longer than a flow path 4 to a lower region of the winding overhang 1. In order to nevertheless attain a most uniform possible cooling of individual regions of the winding overhang 1, separate flow paths 4 from the fan 5 to the lower region of the winding overhang 1 and to the upper region of the winding overhang 1 are provided on the one hand. The corresponding division is in this case achieved by a separating device 7, which can be embodied as a plate in a coolant shaft 17, for example.

On the other hand, guiding elements 11 are positioned in the coolant shaft 17, which guiding elements 11 are oriented approximately radially in order to redirect a flow in the coolant shaft 17 to one portion each, in order to radially apply a cooling an or a different fluid to the winding overhang 1, On the connection side illustrated, said guiding elements 11 are formed by connection towers in Which individual bars of the winding overhang 1 of the stator are electrically connected on the connection side.

On the non-connection side, which is located opposite from the connection side, the guiding elements 11 can be formed by guide plates arranged in the coolant shaft 17.

Figure 3:
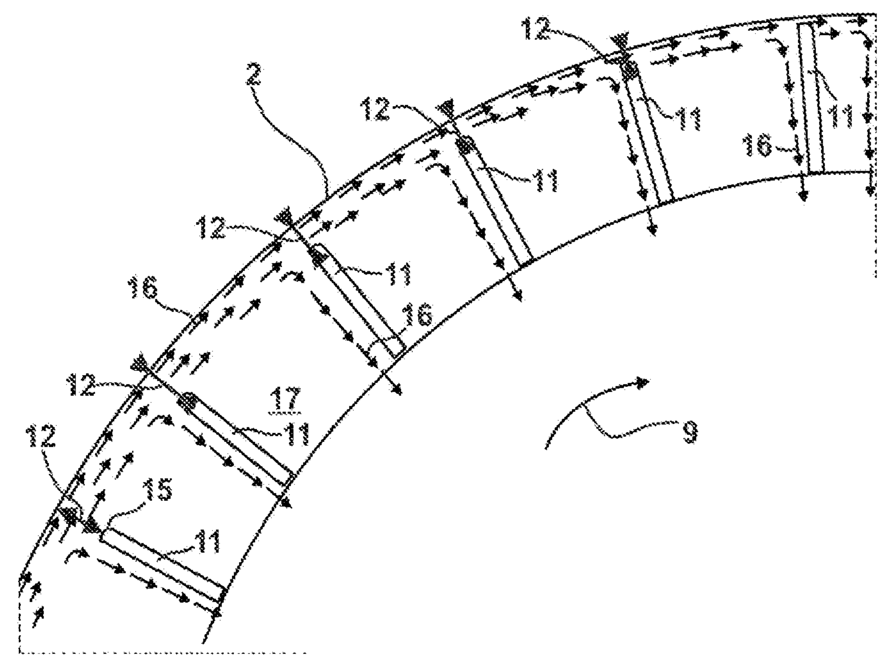
FIG. 3 shows a further detail of a machine according to the invention.

FIG. 3 shows in detail an upper region of the coolant shall 17 illustrated in FIG. 2 which has an outer surface that is roughly rotationally symmetrical to a rotor axis 3 of the generator, so that the coolant shall 17 is embodied here to be approximately arc-shaped.

In order to achieve a uniform cooling of the winding overhang 1, the guiding elements 11 extend, as depicted, radially farther outwardly at an increasing distance from the heat exchanger 6 in a direction of flow, so that at each guiding element 11, a further region of a flow running in a circumferential direction 9 in the coolant shaft 17 is shaved off, or is redirected inwardly into a radial flow that is applied to the respective region of the winding overhang 1 in order to cool said winding overhang 1.

FIG. 3, like FIG. 2, shows only a portion of the coolant shaft 17 for ventilating a left-hand portion of the winding overhang 1, wherein the corresponding right-hand portion is embodied symmetrically. Accordingly, in the right-hand portion not illustrated, the guiding elements 11 also extend radially farther outwardly at an increasing distance from the heat exchanger 6 in the direction of flow, and the flow in said right-hand portion runs in an opposing manner to the indicated direction of flow.

A clear flow cross section 12 between the guiding elements 11 and the outer surface thus continuously decreases from one guiding element 11 to the next guiding element 11 along the direction of flow, wherein said direction of flow can be oriented both in a circumferential direction 9 and opposite to the circumferential direction 9. As a result, it is easily ensured that each of the guiding elements 11 redirects a portion of the flow into a radial flow inwardly towards the winding overhang 1 and a shadowing of guiding elements 11 located downstream is compensated.

The individual guiding elements 11 are thus, as depicted, each spaced apart from the outer surface, whereby it is ensured that only a portion of the volume flow flowing in a circumferential direction 9 is redirected inwardly in a radial direction 8, so that a volume flow also remains for the portions of the winding overhang 1 that are located downstream in the direction of flow in order to visualize this, velocity vectors 16 of the cooling fluid or cooling medium are illustrated in the coolant shaft 17.

Furthermore, it can be seen that the guiding elements 11 are embodied to be rounded at a radially outer end, namely on a discharge side. A rounding 1 of an edge on a side of the guiding element 11 arranged downstream can thereby have a radius of 1 mm to 20 mm, for example. As a result, turbulences which would have negative effects on the redirection are avoided in this region.

A machine embodied according to the invention exhibits a particularly uniform cooling of the winding overhang region, so that hot spots that could result w damage are effectively avoided.

The invention claimed is:

1. An electrical machine having a stator comprising:

a winding overhang, a rotor arranged rotatably about a rotor axis in the stator, and a heat exchanger, wherein the heat exchanger is fluidically connected to the winding overhang via a coolant shaft, which is arranged radially outside the winding overhang, runs at least partially approximately along a circumferential direction, and is delimited in a radial direction by an outer surface, so that the winding overhang can be cooled by a continuous flow of a fluid over the heat exchanger and the winding overhang, and multiple guiding elements being arranged in a distributed manner along a circumferential direction in the coolant shaft in order to redirect a flow of a fluid oriented in the circumferential direction in the coolant shaft at least partially into a radial flow towards the winding overhang and to distribute the flow to multiple regions of the winding overhang, wherein the multiple guiding elements are arranged with a spacing from the outer surface, and wherein the multiple guiding elements have different spacings from the outer surface, wherein the multiple guiding elements have a smaller spacing from the outer surface at an increasing distance from the heat exchanger in the direction of flow.

2. The electrical machine according to claim 1, wherein the multiple guiding elements are roughly radially oriented.

3. The electrical machine according to claim 1, wherein the outer surface is at least partially embodied roughly as a surface of revolution with the rotor axis.

4. The electrical machine according to claim 1, wherein the multiple guiding elements are arranged with an approximately equal spacing from the rotor axis.

5. The electrical machine according to claim 1, wherein the multiple guiding elements comprise 10 to 100 guiding elements arranged in a distributed manner over a circumference.

6. The electrical machine according to claim 1, wherein a clear flow cross section between the outer surface and the multiple guiding elements continuously decreases, at least in some regions, from one of the multiple guiding elements to a next one of the multiple guiding elements at an increasing distance from the heat exchanger in the direction of flow.

7. The electrical machine according to claim 1, wherein the multiple guiding elements are embodied to be plate-shaped.

8. The electrical machine according to claim 1, wherein at least some of the multiple guiding elements comprise a rounded edge at an end that delimits a clear flow cross section between the outer surface and the guide elements.

9. The electrical machine according to claim 1, wherein the multiple guiding elements are formed by elements connected in a fixed manner to the winding overhang.

10. The electrical machine according to claim 1, wherein a fan is provided with which a flow of a fluid can be produced in the machine from the heat exchanger through the coolant shaft to the winding overhang and back to the heat exchanger.

11. The electrical machine according to claim 10, wherein the stator comprises two winding overhangs and each winding overhang is connected to the fan and the heat exchanger via a separate flow path.

12. The electrical machine according to claim 1, wherein separate flow paths are provided for an upper region of the winding overhang and a lower region of the winding overhang.

13. The electrical machine according to claim 1 being a generator.

14. The electrical machine according to claim 3, wherein the outer surface is at least partially embodied roughly as an outer cylinder surface or outer cone surface.

15. The electrical machine according to claim 1, wherein the multiple guiding elements comprise 30 to 60 guiding elements arranged in a distributed manner over a circumference.

16. The electrical machine according to claim 8, wherein the rounded edge of the at least some the multiple guiding elements is arranged on a discharge side.

17. The electrical machine according to claim 9, wherein the multiple guiding elements are formed by connection towers.

18. The electrical machine according to claim 10, wherein the fan comprises an axial fan and the flow of the fluid comprises air.

* * * * *